UNITED STATES PATENT OFFICE.

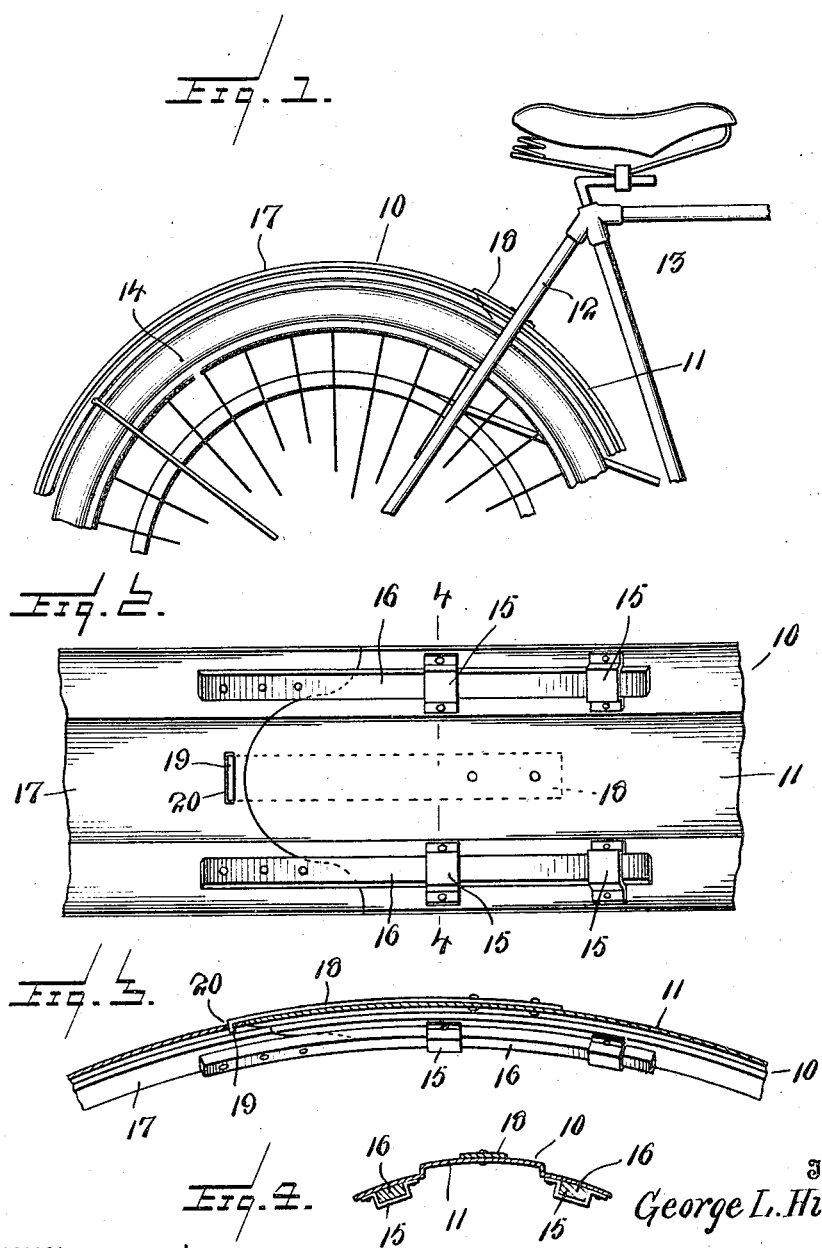

GEORGE L. HUMBLE, OF PORT ARTHUR, TEXAS.

MUD-GUARD.

1,069,550.

Specification of Letters Patent.

Patented Aug. 5, 1913.

Application filed November 15, 1912. Serial No. 731,586.

*To all whom it may concern:*

Be it known that I, GEORGE L. HUMBLE, a citizen of the United States, residing at Port Arthur, in the county of Jefferson and State of Texas, have invented new and useful Improvements in Mud-Guards, of which the following is a specification.

An object of the invention is to provide a mud guard for vehicles such as bicycles and motorcycles.

The invention embodies, among other features, a mud guard comprising a rigid section and a removable section, the said rigid section and said removable section, when connected, being adapted to prevent the mud or dirt carried around with the rear wheel of the vehicle from spattering on to the clothes of the rider of the vehicle, the said mud guard being preferably used in connection with vehicles of the bicycle or motorcycle type.

In the further disclosure of the invention reference is to be had to the accompanying drawings, constituting a part of this specification, in which similar characters of reference denote corresponding parts in all the views, and in which:

Figure 1 is a fragmentary perspective view of the rear wheel of a motorcycle, showing a portion of the frame and the mud guard mounted thereon; Fig. 2 is a bottom plan view of the mud guard; Fig. 3 is a longitudinal sectional view of the mud guard; and Fig. 4 is a transverse sectional view taken on the line 4—4 in Fig. 2.

Referring more particularly to the views, use is made of a mud guard 10 including a curved section 11 for rigid attachment to the frame 12 of a vehicle 13, the said section being arranged above and in spaced relation to the usual rear wheel 14 of the vehicle 13.

Brackets 15 are rigidly secured to the under side of the rigid section 11 and are adapted to receive therethrough tongues 16 projecting forwardly and rigidly secured to a removable curved section 17 which, together with the section 11, constitutes the mud guard 10, the said tongues 16 projecting forwardly from the forward end of the section 17 so that when the tongues 16 pass through the brackets 15 the forward end of the section 17 will abut against the rear end of the section 11, as shown, the curvature of the said sections when united in the manner mentioned, being similar to the curvature of the wheel 14.

A locking member 18, consisting of a single piece of flat spring-like material is secured to the rear end of the section 11 on the upper side thereof, and projects rearwardly beyond the rear end of the section 17 to engage the forward end of the section 17, the rear end of the locking member terminating in an integral flange 19 adapted to spring into and project through an opening 20 formed in the removable section 17.

It will now be seen that by simply pressing the flange 19 out of the opening 20, the section 17 can be readily removed from the section 11 by simply pulling rearwardly on the section 17, thus removing the tongues 16 from the brackets 15, it being further seen that the tongues 16 when in engagement with the brackets 15, support the section 17 on the section 11 and in spaced relation to the wheel 14, while the locking member 18 locks the section 17 to the section 11 and also on account of the spring-like action of the material from which the locking member is made, prevents any rattling of the section 17 relatively to the rigid section 11.

As mentioned heretofore, the mud guard is provided to prevent mud or dirt carried around by the wheel when the vehicle is operated from spattering over the clothes of the operator or rider and from the foregoing description it will be seen that the device described is simple and consists of few parts that can be cheaply and durably manufactured.

Having thus described my invention, I claim:

1. In a mud guard, the combination with a section for attachment to the frame of a vehicle, of a second section, a plurality of spaced relatively parallel tongues projecting beyond an end of the second section, brackets on the under side of the first section and having the tongues passing therethrough, and a spring-like locking member carried on the upper side of the first section and projecting beyond an end thereof and through a slot in the second section to rigidly lock the said sections together.

2. In a mud guard, the combination with a section for attachment to the frame of a vehicle, of a second section, tongues carried by the second section and engaging the first section on the under side thereof, and a locking member lying between the said tongues and secured to the upper side of the first section, the said locking member projecting beyond an end of the first section and engaging the second section to lock the said sections together.

In testimony whereof I affix my signature in presence of two witnesses.

GEORGE L. HUMBLE.

Witnesses:
 BILLIE ALDORETTE,
 J. S. ROLLINS.